(No Model.)

J. W. IVORY.
COMBINED RUBBER DAM CLAMP AND NAPKIN HOLDER.

No. 384,577. Patented June 12, 1888.

WITNESSES:
A. P. Jennings.
L. Douville.

INVENTOR:
James W. Ivory
BY Niederheim & Kutter
ATTORNEYS.

UNITED STATES PATENT OFFICE.

JAMES W. IVORY, OF PHILADELPHIA, PENNSYLVANIA.

COMBINED RUBBER-DAM CLAMP AND NAPKIN-HOLDER.

SPECIFICATION forming part of Letters Patent No. 384,577, dated June 12, 1888.

Application filed November 21, 1887. Serial No. 255,759. (No model.)

*To all whom it may concern:*

Be it known that I, JAMES W. IVORY, a subject of the Queen of Great Britain, residing in the city and county of Philadelphia, State of Pennsylvania, have invented a new and useful Improvement in a Combined Dental Rubber-Dam Clamp and Napkin-Holder, which improvement is fully set forth in the following specification and accompanying drawings.

My invention consists in providing a dental rubber-dam clamp with a napkin-holder, as hereinafter described and claimed, the convenience of which will be greatly appreciated by dentists.

Figure 1:
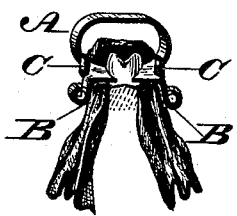
Figure 2:
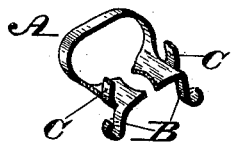

Figures 1 and 2 represent perspective views of a combined dental rubber-dam clamp and napkin-holder embodying my invention, the same being shown in position in Fig. 1.

Similar letters of reference indicate corresponding parts in the two figures.

Referring to the drawings, A represents a rubber-dam clamp, which, excepting the features of my invention applied thereto, is of usual construction.

Projecting from the base of the clamp are lips B, whose ends are bent so as to avoid sharp edges, this, however, being desirable, but not a necessity, it being seen that the lips and base of the clamp form together hooks, which are adapted to hold a napkin employed in a dental operation.

It will be seen that the clamp is fitted to a tooth, as usual, and a napkin is applied under the lips B, between the same and the gum or adjacent parts of the mouth, whereby the napkin is nicely held in position, leaving the hands of the dentist free for operations. When the clamp is employed on a tooth of the upper jaw, the lips set out the rubber dam sufficiently to prevent the same from folding over the clamp. The base has also projecting from it in opposite directions to the lips B the lugs or lips C, which are designed to be engaged by the beaks of a pair of forceps for spreading or opening the clamp and thus permitting the ready removal of the same from the tooth.

In practice the clamp, with its lips B C, is made of one piece of suitable metal, and will be found to be an inexpensive, simple, and convenient device for the purposes intended.

In another application filed by me January 19, 1888, and bearing Serial No. 261,216, a dental rubber-dam adjuster and clamp are shown and described, the same having arms projecting in opposite directions, the projections being upwardly and downwardly relative to the jaw to which they are designed to be applied. So far as the same features are shown and described in this (the present) application they are not claimed herein, being claimed in said application, No. 261,216, referred to above.

Having thus described my invention, what I claim as new, and desire to secure by Letters Patent, is—

1. A combined dental rubber-dam clamp and napkin-holder, consisting of a clamp having the lips B for the engagement of a napkin, substantially as described.

2. A combined dental rubber-dam clamp and napkin-holder, having the clamp portion A and provided with lips B and lugs C, substantially as and for the purpose set forth.

JAMES W. IVORY.

Witnesses:
JOHN A. WIEDERSHEIM,
JAMES F. KELLY.